(12) United States Patent
Halper et al.

(10) Patent No.: US 9,667,905 B1
(45) Date of Patent: May 30, 2017

(54) SWITCHER FOR WIRELESS DISPLAY DEVICES

(71) Applicant: EchoStar Technologies L.L.C., Englewood, CO (US)

(72) Inventors: Brandon Halper, Aurora, CO (US); Lawrence Moran, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/948,672

(22) Filed: Nov. 23, 2015

(51) Int. Cl.
| | |
|---|---|
| H04N 5/60 | (2006.01) |
| H04W 4/00 | (2009.01) |
| H04W 76/02 | (2009.01) |
| H04N 5/44 | (2011.01) |
| H04N 5/38 | (2006.01) |

(52) U.S. Cl.
CPC ............. *H04N 5/60* (2013.01); *H04N 5/38* (2013.01); *H04N 5/4403* (2013.01); *H04W 4/008* (2013.01); *H04W 76/023* (2013.01)

(58) Field of Classification Search
USPC .................. 348/725, 705, 706, 460
See application file for complete search history.

(56) References Cited

U.S. PATENT DOCUMENTS

| | | | | |
|---|---|---|---|---|
| 8,621,508 B2* | 12/2013 | Rowe | ................... | G11B 27/031 725/109 |
| 8,990,104 B1* | 3/2015 | Zhu | .................... | G06Q 30/0275 705/14.4 |
| 9,332,285 B1* | 5/2016 | Grant | ................ | H04N 21/23439 |
| 2006/0251115 A1* | 11/2006 | Haque | ................... | H04B 7/2606 370/466 |
| 2008/0281448 A1* | 11/2008 | Uhrig | ...................... | G06Q 20/10 700/94 |
| 2009/0083634 A1* | 3/2009 | Madonna | ................ | G06F 3/023 715/733 |
| 2010/0057563 A1* | 3/2010 | Rauber | ................... | G06Q 30/02 705/14.53 |
| 2010/0057924 A1* | 3/2010 | Rauber | ................... | G06Q 30/00 709/229 |
| 2010/0146576 A1* | 6/2010 | Costanzo | .......... | H04L 29/06027 725/117 |
| 2011/0074794 A1* | 3/2011 | Felt | ..................... | H04N 21/4122 345/520 |
| 2012/0050012 A1* | 3/2012 | Alsina | ................ | H04N 21/4126 340/10.1 |
| 2013/0222601 A1* | 8/2013 | Engstrom | ............ | G11B 27/034 348/159 |
| 2014/0082681 A1* | 3/2014 | Brown | .............. | H04N 21/64723 725/98 |
| 2014/0267571 A1* | 9/2014 | Periyannan | ............... | H04N 7/15 348/14.08 |

* cited by examiner

*Primary Examiner* — Paulos M Natnael
(74) *Attorney, Agent, or Firm* — Bejin Beineman PLC

(57) ABSTRACT

A media switching device includes a computer including a processor programmed to actuate the media switching device to select, based on a first input received from a user, a first media content item from one or more received media content items. The processor is further programmed to transmit a first portion of the first media content item via a first wired connection to a first media display device; and transmit a second portion of the first media content item to a second media display device via a radio frequency transceiver.

18 Claims, 8 Drawing Sheets

SWITCHER FOR WIRELESS DISPLAY DEVICES

BACKGROUND

Home entertainment systems commonly include multiple media sources such as a set top box, a digital versatile disc (DVD) player, and a game box all connected via a switching device to a stationary display device such as a television or monitor. The switching device typically allows a user to switch between the media sources by inputting a command, e.g., via an interface such as a remote control. The switching device may provide a switched video signal and a switched audio signal to the television. However, in some cases, a user may be using a Bluetooth display device such as Bluetooth headphones to receive a portion (e.g., audio portion) of a media content item. The Bluetooth display device is commonly connected directly to the media source device. Switching from a first media source to a second media source while using the Bluetooth display device may disadvantageously require disconnecting the Bluetooth display device from the first media source and connecting the Bluetooth display device with the second media source, creating work and inconvenience for the user.

DRAWINGS

DETAILED DESCRIPTION

Exemplary System

A switching device provides a mechanism for switching between different media sources for a Bluetooth display device based on input from a user. Advantageously, therefore, the disclosed system spares the work and inconvenience associated with disconnecting from a first media source device and connecting with a second media source device.

Figure 1:
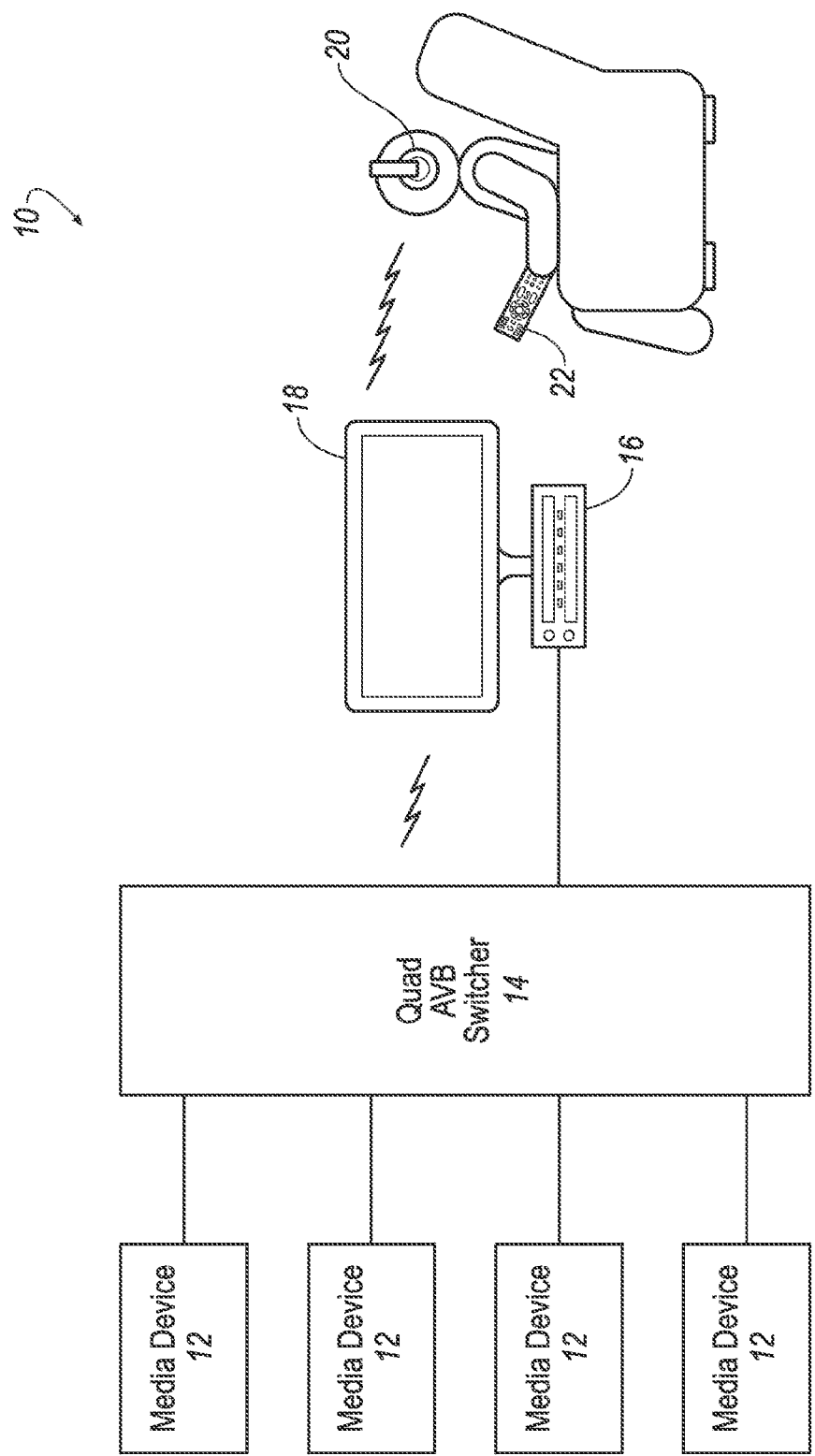
FIG. 1 is a diagram of a media system providing switching between media source devices while using a Bluetooth display device.

FIG. 1 illustrates a media system 10 including a plurality of media devices 12. The media devices 12 provide media content, and are typically known devices such as a set-top box, a laptop, desktop, tablet computer, digital versatile disc (DVD) player, compact disc (CD) player, game box, etc. The term "media content" as used herein, refers to digital audio and/or video data received in a media device 12. The media content may be received from a media source such as one or more of a cable or satellite television headend, a video streaming service such as generally includes a multimedia web server (or some other computing device), etc.

Accordingly, media content is typically delivered as compressed audio and/or video data. For example, the data may be formatted according to known standards such as MPEG or H.264. MPEG refers to a set of standards generally promulgated by the International Standards Organization/International Electrical Commission Moving Picture Experts Group (MPEG). H.264 refers to a standard promulgated by the International Telecommunications Union (ITU). Accordingly, by way of example and not limitation, media content may be provided to a media device in a format such as the MPEG-1, MPEG-2 or the H.264/MPEG-4 Advanced Video Coating standards (AVC) (H.264 and MPEG-4 at present being consistent). As is known, MPEG and H.264 data include metadata, audio, and video components. Further, media content in the system 10 could alternatively or additionally be provided according to some other standard or standards. For example, media content could be audio data formatted according to standards such as MPEG-2 Audio Layer III (MP3), Advanced Audio Coding (AAC), etc.

The media devices 12 are each connected, via a quad audio/video/Bluetooth switcher 14 (hereinafter quad AVB switcher), to a stationary display device 16, such as a television receiver. It is to be understood that, although referred to herein as a stationary display device 16, the stationary display device may be movable, mobile, etc., and may include a television receiver, a monitor, a desktop computer, a laptop computer, a tablet, a mobile telephone, etc. The stationary display device 16 may include a display 18 for viewing a video portion of the media content received from a selected media device 12.

The system 10 further includes a Bluetooth display device 20 which may receive a portion (e.g., an audio portion) of the media content received from the selected media device 12. The Bluetooth display device 20 may be, e.g., Bluetooth enabled headphones, Bluetooth enabled speakers, etc.

As further shown in FIG. 1, the media system 10 may include a remote control 22 that accepts user input in a known manner to control the quad AVB switcher 14. Based on commands from the remote control 22, the quad AVB switcher 14 may select the media content, provided by one of the media devices 12, for displaying on the stationary display device 16 and the Bluetooth display device 20.

The examples of switching devices below are each described as having four media input devices 12 by way of example, and not limitation. A switching device may be programmed to receive media data from any number of media devices. Further, the examples below are described based on the use of a Bluetooth protocol, as is known. It is expected that other wireless protocols, including future variations on the Bluetooth protocol, and/or other short range radio frequency communications protocols, may also be used, along with a compatible display device 12.

Figure 2:
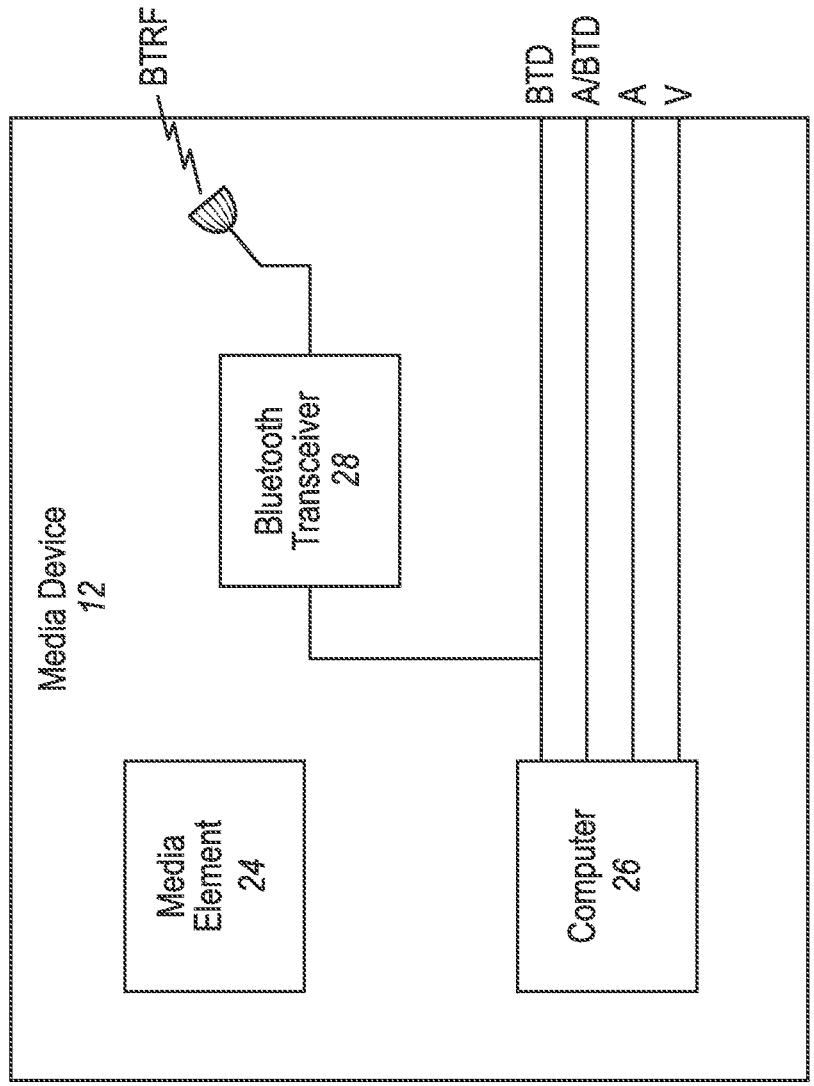
FIG. 2 is a block diagram of an exemplary media device that could be included in the media system of FIG. 1.

As shown in FIG. 2, a media device 12 may include a media element 24, a computer 26 and a Bluetooth transceiver 28. The media devices 12 provide media content to the stationary display device 16 and to the Bluetooth display device 20, and may be, for example, one or more set top boxes, one or more game boxes, one or more digital versatile disc (DVD) players, etc. The media devices 12 may provide the media content in the form of a video signal and an audio signal, as is known.

The media element 24 can be any one of various known hardware elements that can receive, e.g., from a source outside a customer premises, or generate, e.g., by reading a medium that stores digital data, the media content, and may be, e.g., a connection to a satellite system or cable system for receiving media content, a DVD reader which reads data from DVDs, a compact disc (CD) reader which reads data from CDs, a radio receiver which receivers radio frequency signals and extracts the data content, etc. The media element 24 receives and/or generates media data and may provide the data, e.g., to the computer 26.

The computer 26 includes a memory and a processor, the memory storing program code, i.e., computer-executable instructions, executable by the processor. The computer 26 is communicatively coupled to each of the media element 24 and the Bluetooth transceiver 28. The computer 26 may be programmed to receive media content data from the media element 24, and based on the data, to generate known outputs including Video data (V), audio data (A), Bluetooth data (BTD), and/or audio/Bluetooth data (Audio/BTD).

The video and audio outputs may include respectively a video and audio portion of the media content item, and may be output, e.g., to the quad AVB switcher 14. The Bluetooth data signal may include a portion of the media content item, for example, the audio portion, formatted for transmission by the Bluetooth transceiver 28. The audio/Bluetooth data may include both the audio portion of the media content item, and the Bluetooth data. The outputs may be mixed and/or multiplexed as is known for transmission along a common transmission path, for example a wired or wired-pair connection.

Although the examples herein discuss transmitting the audio outputs, video outputs and audio/BTD outputs from the media device 12 to the quad AVB switcher 14 via wired connections, wireless connections may also be used. For example, the media device 12 may transmit one or more of the audio data (A), video data (V) and audio/BTD data (A/BTD) to the quad AVB switcher 14 via one or more wireless connections, e.g., a WiFi connection according to the Institute of Electrical Engineers' (IEEE) 802.11 standard.

The computer 26 may output one or more of the video data, audio data, Bluetooth data, and audio/Bluetooth data to the quad AVB switcher 14. Additionally or alternatively, the computer 26 may output the Bluetooth data signal to the Bluetooth transceiver 28 included in the media device 12.

The Bluetooth transceiver 28 may include hardware elements, software elements, one or more processors and memory. The Bluetooth transceiver 28 may be programmed to generate a Bluetooth radio frequency (BTRF) output based on the Bluetooth data. The Bluetooth transceiver 28 may further be programmed to transmit the BTRF output, e.g., to the quad AVB switcher 14.

The Bluetooth transceiver 28 is programmed to connect, based on one or more instructions from the computer 26, with a Bluetooth Radio Frequency (RF) Switcher 44 (FIG. 6) which may be included in the quad AVB switcher 14. Connecting with the Bluetooth RF switcher 44 in the context of this disclosure means establishing a communications channel between the Bluetooth transceiver 28 and the Bluetooth RF switcher 44 according to Bluetooth protocol, as is known.

Referring back to FIG. 1, the quad AVB switcher 14 generally receives video, audio and Bluetooth formatted data (digital or RF) from one or more media devices 12. The quad AVB switcher 14 further receives user commands, e.g., from a remote control 22, and based on the user commands, selects media content from one of the media input devices 12 for transmission to the stationary display device 16 and Bluetooth display device 20. The quad AVB switcher 14 transmits via a wired or wireless connection a video signal to the stationary display device 16 and further transmits a Bluetooth signal including an audio signal to the Bluetooth headphones 20. Examples of the quad AVB switcher 14 are discussed below.

The stationary display device 16 may be, e.g., a high definition television with video and audio inputs as is known. Additionally or alternatively, the stationary display device 16 may include a wireless interface, for example a WiFi interface according to the Institute of Electrical Engineers' (IEEE) 802.11 standard, which may be used to receive video and audio signals output from the quad AVB switcher 14 via wireless transmission.

The stationary display device 16 may include a computing device, a display 18 for displaying video content, and speakers, for outputting audio content. The computing device may be programmed to receive video and audio inputs from, e.g., the quad AVB switcher 14, and to output the video and audio via the display 18 and the speakers. The video and audio inputs may be received via a wired or wireless connection. In the case that a Bluetooth display device 20 is being provided the audio portion of a media content item, the speakers on the stationary display device 16 may be turned off.

The Bluetooth display device 20 includes a Bluetooth transceiver which is programmed to receive Bluetooth radio frequency (RF) data including audio data. The Bluetooth display device 20 may be, e.g., Bluetooth enabled headphones, a Bluetooth enabled speaker, etc. The Bluetooth display device 20 includes circuitry as is known which can extract the audio data from the Bluetooth (RF) data. The circuitry may include hardware elements, software elements, one or more processors and memory. The Bluetooth display device 20 further includes circuitry which can amplify the audio, and output the audio via one or more speakers.

The remote control 22 may include a user interface, e.g., buttons, a touch screen device, a gesture recognition device, etc., for receiving the input from the user. The remote control 22 may further include a computing device and a transmitter for transmitting signals to the quad AVB switcher 14. The transmitter may be, for example, an infrared transmitter, or a radio frequency transmitter, as are known. The remote control 22 computing device may receive input from the user interface, generate commands for the quad AVB switcher 14, and transmit the commands via the transmitter to the quad AVB switcher 14.

Figure 3:
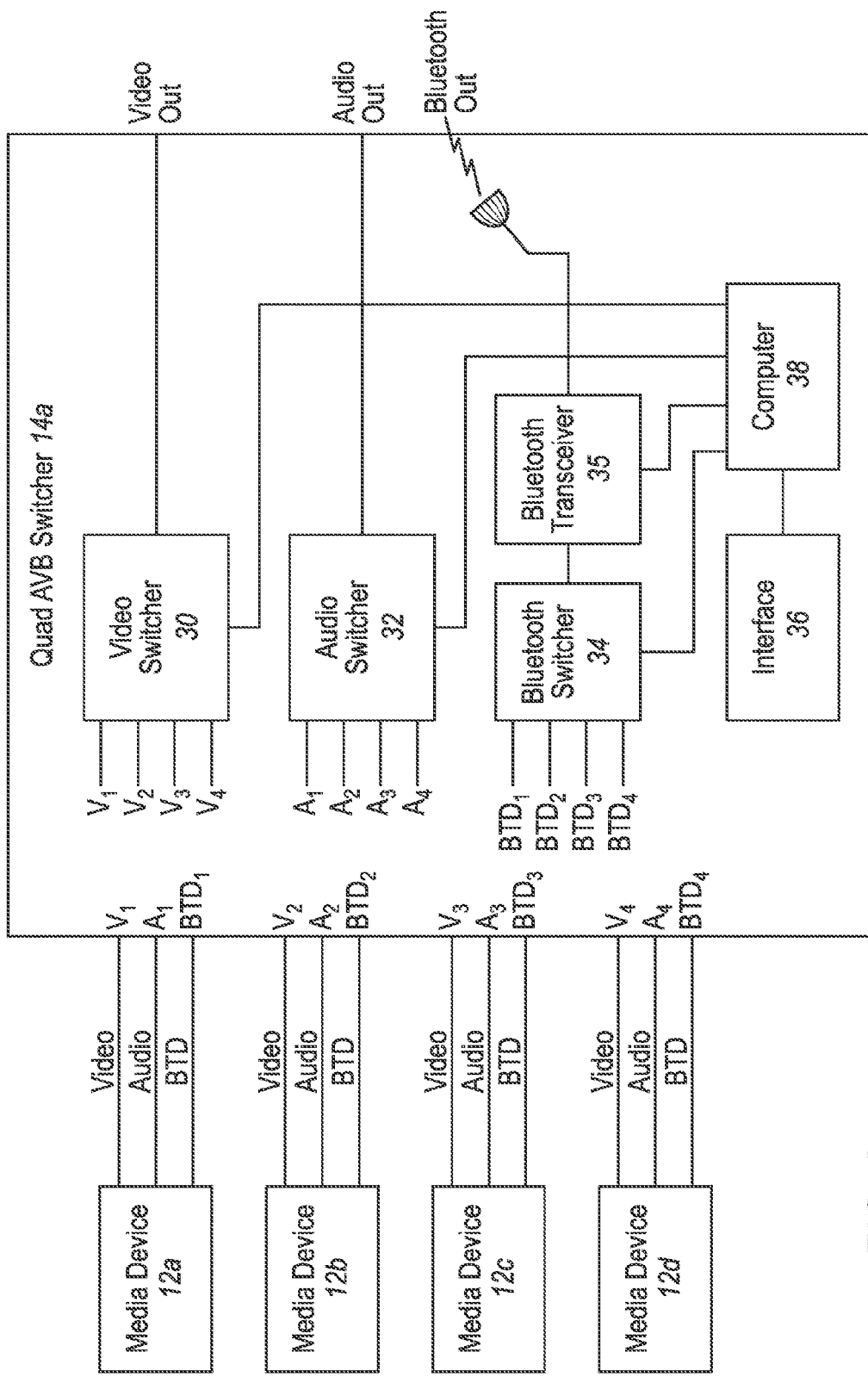
FIG. 3 is a block diagram of a first example of a quad switcher that could be included in the media system of FIG. 1.

A first example quad AVB switcher 14a is shown in FIG. 3. The quad AVB switcher 14a includes a video switcher 30, an audio switcher 32, a Bluetooth switcher 34, a Bluetooth transceiver 35, a user interface 36, and a computer 38. The quad AVB switcher 14a is programmed to receive media content from media devices 12a, 12b, 12c, 12d. The media content for each of the media devices 12a, 12b, 12c, 12d includes video data, audio data, and Bluetooth data (BTD). For purposes of the following discussion, the video, audio, and BTD from the media devices 12a, 12b, 12c, 12d will be referred to according to data names as set forth in Table 1.

TABLE 1

| Media Device | Video Data Name | Audio Data Name | Bluetooth Data Name |
|---|---|---|---|
| 12a | $V_1$ | $A_1$ | $BTD_1$ |
| 12b | $V_2$ | $A_2$ | $BTD_2$ |

TABLE 1-continued

| Media Device | Video Data Name | Audio Data Name | Bluetooth Data Name |
|---|---|---|---|
| 12c | $V_3$ | $A_3$ | $BTD_3$ |
| 12d | $V_4$ | $A_4$ | $BTD_4$ |

The video switcher 30 is programmed to receive video inputs $V_1$-$V_4$ and generate a video output. The video output may include media content provided in one of the video input signals $V_1$-$V_4$. The video switcher 30 may include hardware elements, software elements, etc. as are known, e.g., one or more processors and a memory, and may be communicatively coupled to the computer 38. The video switcher 30 may, e.g., receive one or more instructions from the computer 38, and, based on the instructions, select one of the video inputs $V_1$-$V_4$ to generate the video out signal.

The audio switcher 32 is programmed to receive audio signals $A_1$-$A_4$ as inputs and generate an audio output signal. The audio output signal may represent one of the audio inputs $A_1$-$A_4$. The audio switcher 30 may include hardware elements, software elements, one or more processors and a memory, and may be communicatively coupled to the computer 38. The audio switcher 32 may, e.g., receive one or more instructions from the computer 38, and based on the instructions, select one of the audio inputs $A_1$-$A_4$ to generate the audio output signal.

The Bluetooth switcher 34 is programmed to generate a Bluetooth data output signal from a selected one of the Bluetooth data signals $BTD_1$-$BTD_4$. The Bluetooth switcher 34 outputs the Bluetooth data output signal to the Bluetooth transceiver 35 for transmission to, e.g., the Bluetooth display device 20. The Bluetooth switcher 34 may include hardware elements, software elements, one or more processors and a memory, and may be communicatively coupled to the computer 38. The Bluetooth switcher 34 may, e.g., receive one or more instructions from the computer 38, and based on the instructions, select one of the Bluetooth data signals $BTD_1$-$BTD_4$ to be used as a basis to generate the Bluetooth data output signal.

Each of the video output signal and audio output signal may be transmitted to, e.g., the stationary display device via respective wired connections. Alternatively, one or both of the video output signal and audio output signal may be transmitted to the stationary device via a wireless connection, for example a WiFi connection according to the Institute of Electrical Engineers' (IEEE) 802.11 standard.

The Bluetooth transceiver 35 may include hardware elements, software elements, one or more processors and memory. The Bluetooth transceiver 35 may be programmed to generate a Bluetooth radio frequency signal (Bluetooth out) from the Bluetooth data output signal. The Bluetooth transceiver 35 may further be programmed to transmit the Bluetooth out signal, e.g., to the Bluetooth display device 20.

The Bluetooth transceiver 35 is programmed to connect, based on one or more instructions from the computer 38, with a Bluetooth transceiver in the Bluetooth display device 20. Connecting with the Bluetooth transceiver in the Bluetooth display device 20 in the present context means to establish a communications channel between the Bluetooth transceiver 35 and the Bluetooth transceiver included in the Bluetooth display device 20 according to Bluetooth protocol, as is known.

The user interface 36 is included in and/or communicatively coupled to the computer 38, and is programmed to receive input from, and provide output to a user. The interface 36 may include known elements, e.g., buttons, a touchscreen, a gesture recognition device, a mouse, etc. for receiving inputs from a user and one or more displays, lamps, speakers, etc. for providing output to the user. The interface 36 may further include communications elements, such as are known, e.g., an infrared transmitter, infrared receiver, radio frequency receiver, radio frequency transceiver, etc., for receiving messages from, and in some cases, sending messages to, the remote control 22.

For example, the user, via the remote control 22, may indicate that the user wishes to switch from a first media device 12a to a second media device 12b. The interface 36 may receive a message from the remote control 22, and transmit the message to the computer 38. Based on the message, the computer 38 may generate instructions for the video switcher 30, the audio switcher 32 and Bluetooth switcher 34.

The computer 38 includes a memory and a processor, the memory storing program code, i.e., computer-executable instructions, executable by the processor. The computer 38 is programmed to generate instructions for each of the video switcher 30, audio switcher 32, Bluetooth switcher 34 and Bluetooth transceiver 35 based, e.g., on input received from the interface 36. For example, a user may provide input, via the interface 36, requesting to view data from the media device 12b. Based on the input, the computer 38 may instruct the video switcher 30 to generate video out based on the signal $V_2$, instruct the audio switcher 32 to generate audio out based on the signal $A_2$, and the Bluetooth switcher 34 to generate a Bluetooth data output signal based on the signal $BTD_2$.

Figure 4:
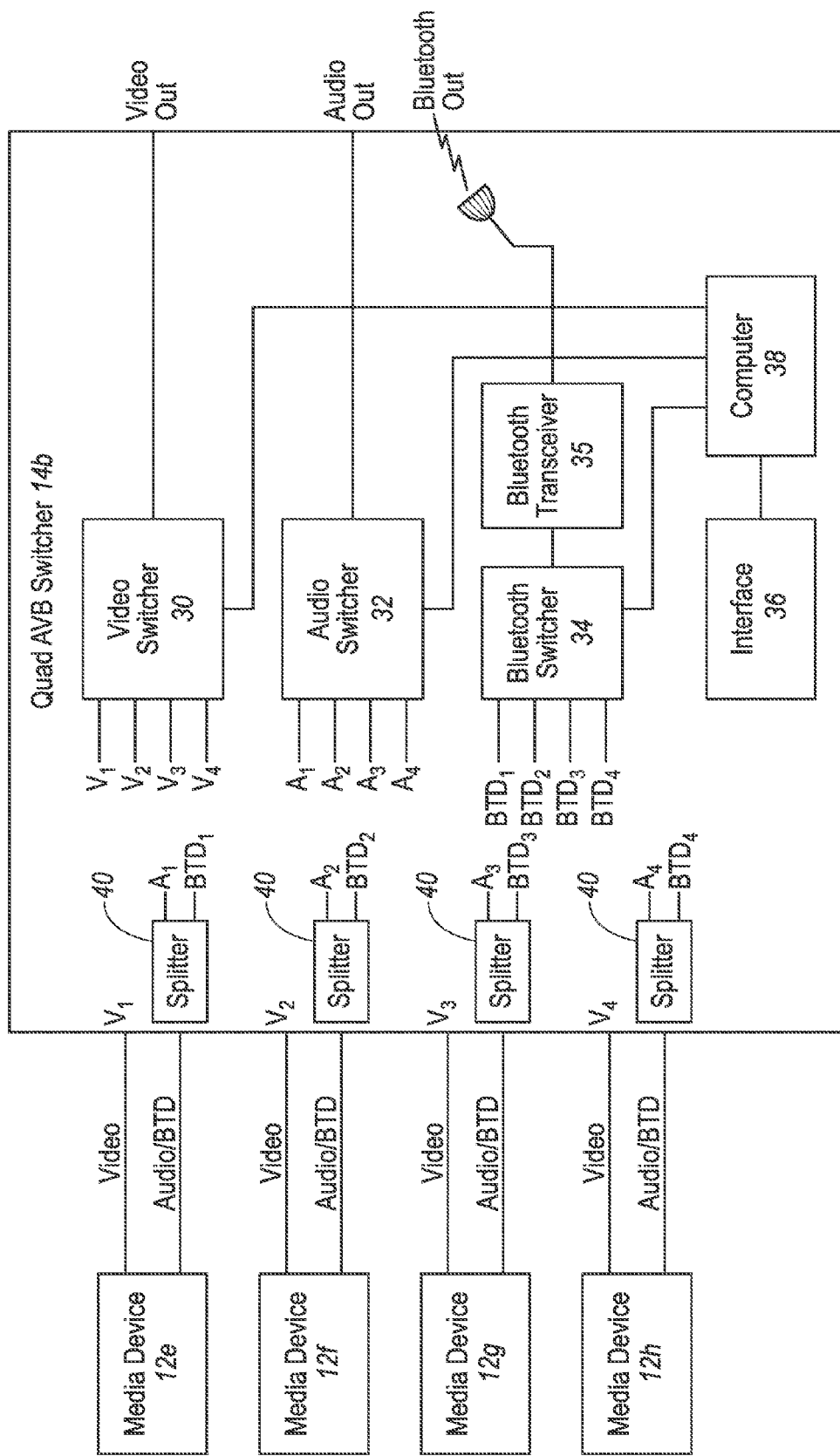
FIG. 4 is a diagram of a second example of a quad switcher that could be included in the media system of FIG. 1.

A second example quad AVB switcher 14b is shown in FIG. 4. The quad AVB switcher 14b is programmed to receive Audio/BTD signals from media devices 12e, 12f, 12g, 12h. As described above, the Audio/BTD signals may include both an audio portion of the media content item, and a Bluetooth data signal. The signals may be mixed and/or multiplexed as is known for transmission along a common transmission path, for example a wired or wired-pair connection.

As shown in FIG. 4, the quad AVB switcher 14b may include one or more splitters 40. Each of the splitters 40 may receive Audio/BTD data, and split the data into an audio and BTD data. In this manner, as shown in FIG. 4, four audio outputs $A_1$-$A_4$ and four Bluetooth data outputs $BTD_1$-$BTD_4$ may be generated.

The second exemplary example quad AVB switcher 14b includes the video switcher 30, audio switcher 32, Bluetooth switcher 34, Bluetooth transceiver 35, interface 36, and computer 38. As described above, each of the video switcher 30, audio switcher 32, and Bluetooth switcher 34 may receive commands from the computer 38. Based on the commands from the computer 38, the video switcher 30 may generate a video output based on a selected one of the video outputs $V_1$-$V_4$, the audio switcher 32 may generate an audio output based on a selected one of the audio outputs $A_1$-$A_4$ and the Bluetooth switcher 34 may generate a Bluetooth data output based on a selected one of the Bluetooth data signal $BTD_1$-$BTD_4$. The Bluetooth data output is provided to the Bluetooth Transceiver 35 which generates a Bluetooth radio frequency output signal (Bluetooth Out).

Also as described above, each of the video output signal and audio output signal may be transmitted to, e.g., the stationary display device via respective wired connections. Alternatively, one or both of the video output signal and audio output signal may be transmitted to the stationary device via a wireless connection, for example a WiFi connection according to the Institute of Electrical Engineers' (IEEE) 802.11 standard.

Figure 5:
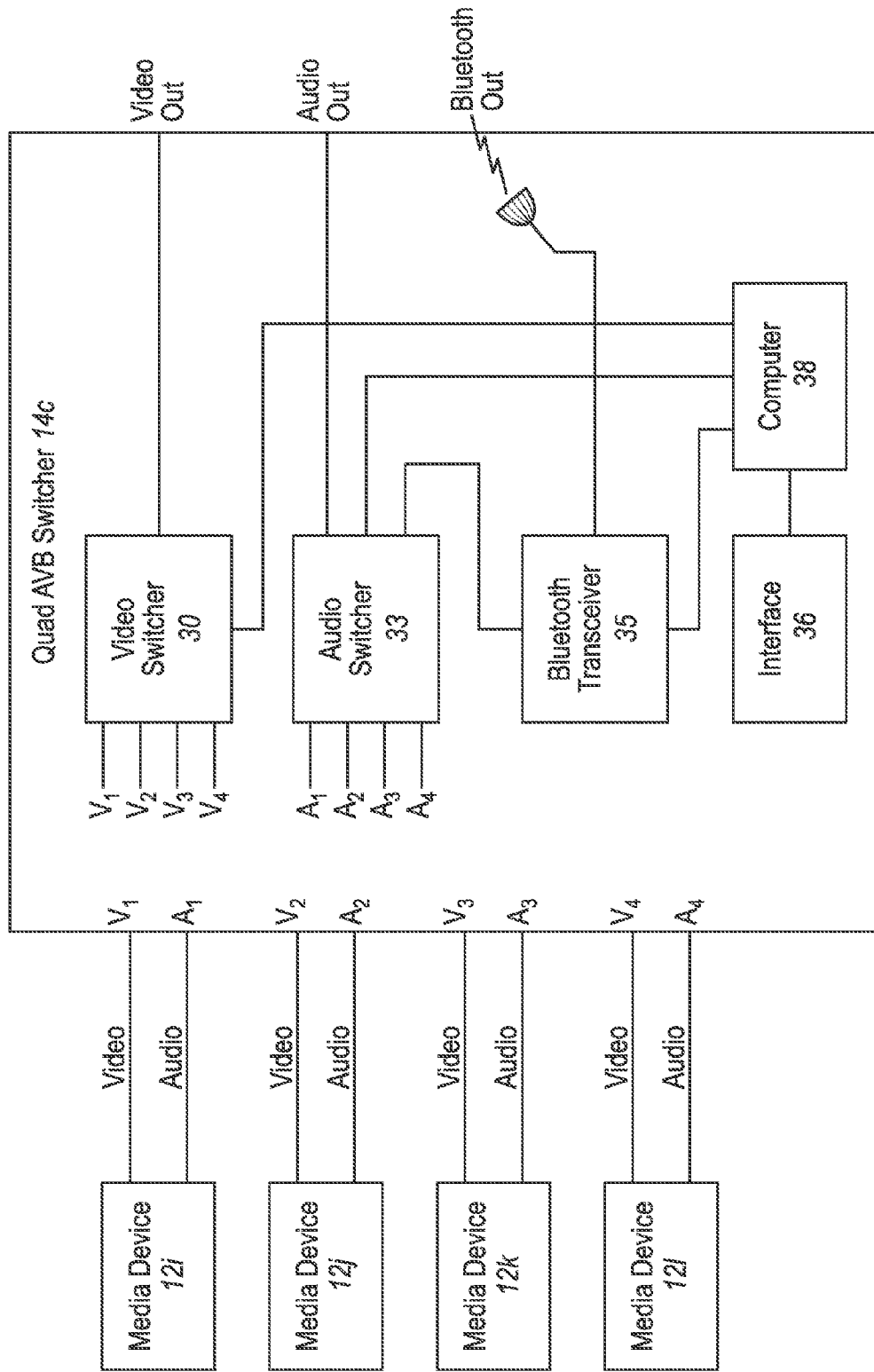
FIG. 5 is a diagram of a third example of a quad switcher that could be included in the media system of FIG. 1.

A third example quad AVB switcher 14c is shown in FIG. 5. The quad AVB switcher 14c is programmed to generate a Bluetooth data output based on a selected one of the audio signals $A_1$-$A_4$. Based on the Bluetooth data output, the quad AVB switcher transmits a Bluetooth radio frequency output (Bluetooth out) to, e.g., the Bluetooth display device 20.

As shown in FIG. 5, the quad AVB switcher 14c includes a video switcher 30, an audio switcher 33, a Bluetooth transceiver 35, an interface 36, and a computer 38.

The video switcher 30 in the quad switcher 14c operates as described above with respect to the quad AVB switchers 14a and 14b.

The audio switcher 33 is programmed, as described above with respect to the audio switcher 32, to generate an audio output based on a selected one of the audio inputs $A_1$-$A_4$. Additionally, the audio switcher 33 is programmed to generate a Bluetooth data output based on the selected audio input signal. The Bluetooth data output is formatted for transmission by the Bluetooth transceiver 35, and includes data representing the selected audio input. The audio switcher 33 outputs the Bluetooth data output to the Bluetooth transceiver 35.

The Bluetooth transceiver 35 is programmed to receive Bluetooth data and generate a Bluetooth radio frequency output. The Bluetooth transceiver 35 may transmit the Bluetooth radio frequency signal, e.g., to the Bluetooth display device 20.

Each of the video output signal and audio output signal may be transmitted to, e.g., the stationary display device via respective wired connections. Alternatively, one or both of the video output signal and audio output signal may be transmitted to the stationary device via a wireless connection, for example a WiFi connection according to the Institute of Electrical Engineers' (IEEE) 802.11 standard.

Figure 6:
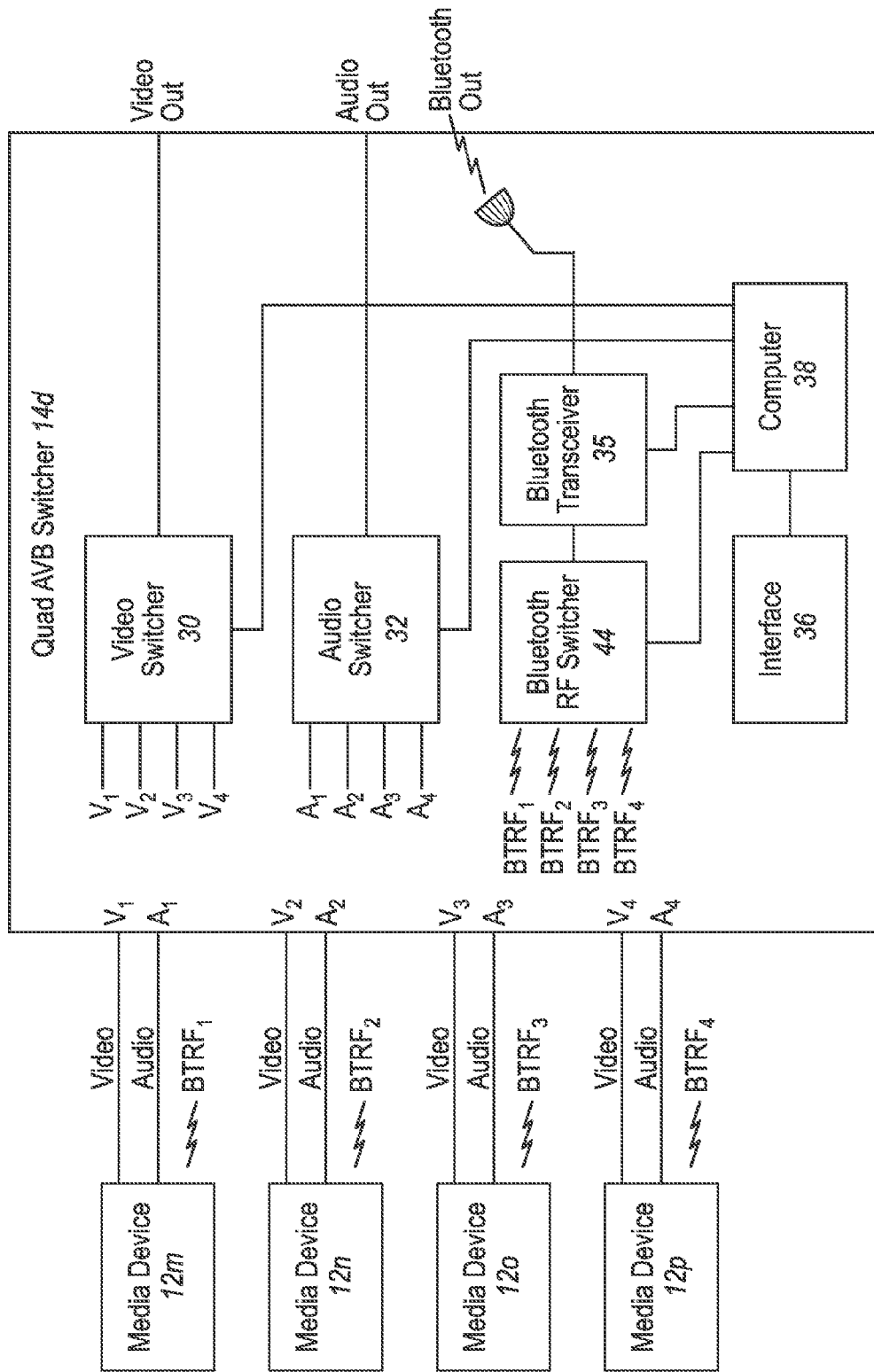
FIG. 6 is a diagram of a fourth example of a quad switcher that could be included in the media system of FIG. 1.

A fourth example quad AVB switcher 14d is shown in FIG. 6. The quad AVB switcher 14d receives a video input and audio input from each of the media devices 12m, 12n, 12o, 12p.

The quad AVB switcher 14d includes a video switcher 30, an audio switcher 32, an interface 36 and a computer 38. The video switcher 30 and audio switcher 32 are programmed to generate video and audio outputs as described above, and to transmit the video and audio outputs to, e.g., the stationary display device 16.

The quad AVB switcher 14d additionally includes a Bluetooth RF switcher 44 and a Bluetooth transceiver 35. The Bluetooth RF switcher 44 is programmed to connect, based on one or more instructions from the computer 38, with a selected one of the media devices 12m, 12n, 12o, 12p. Connecting, by the Bluetooth RF switcher 44, to one of the media devices 12m, 12n, 12o, 12p, in the present context means establishing a communications channel between the Bluetooth RF switcher 44 and the one of the media devices 12m, 12n, 12o, 12p according to Bluetooth protocol as is known.

Still referring to the example of FIG. 6, upon connecting with the selected one of the media devices 12m, 12n, 12o, 12p, the Bluetooth RF switcher 44 receives a Bluetooth RF signal from the selected media device 12m, 12n, 12o, 12p as illustrated in Table 2.

TABLE 2

Correspondence of Bluetooth radio frequency data to selected Media Device

| Selected Media Device | Bluetooth Radio Frequency Data |
|---|---|
| 12m | $BTRF_1$ |
| 12n | $BTRF_2$ |
| 12o | $BTRF_3$ |
| 12p | $BTRF_4$ |

Based on the selected Bluetooth RF output, the Bluetooth switcher 44 may generate a Bluetooth data output and provide the Bluetooth data output to the Bluetooth transceiver 35. The Bluetooth transceiver 35 may generate a Bluetooth radio frequency signal (Bluetooth Out) based on the Bluetooth data output signal, and transmit the Bluetooth radio frequency signal to, e.g., the Bluetooth display device 20.

The Bluetooth RF switcher 44 is programmed, upon receiving a further instruction from the computer 38, to switch from a first one of the media devices 12m, 12n, 12o, 12p, to a second one of the media devices 12m, 12n, 12o, 12p. In order to connect with the second media device 12m, 12n, 12o, 12p, the Bluetooth RF switcher 44 may need to first disconnect with the first media device 12m, 12n, 12o, 12p. Disconnecting may include, e.g., releasing the communications channel that was established during the previous connecting process.

Figure 7:
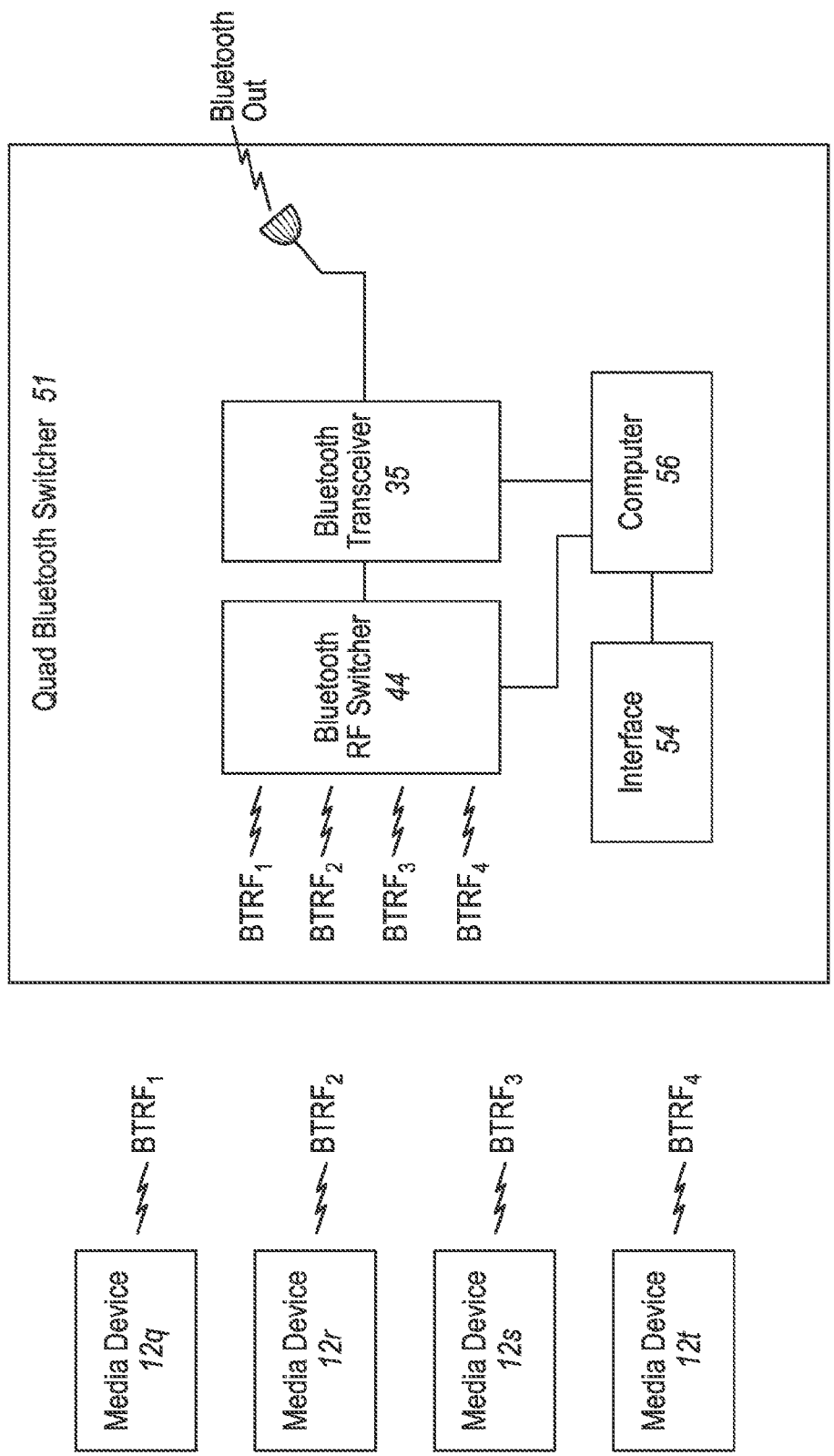
FIG. 7 is a diagram of an example stand-alone Bluetooth switcher with an input transceiver for connecting to media source devices.

A stand-alone quad Bluetooth switcher 51 is shown in FIG. 7. The quad Bluetooth switcher 51 includes a Bluetooth RF switcher 44, a Bluetooth transceiver 35, an interface 54 and a computer 56. The quad Bluetooth switcher 51 is generally programmed to generate a Bluetooth radio frequency output signal based on a selected Bluetooth radio frequency input BTRF. The Bluetooth radio frequency input is received from a selected one of the media input devices 12q, 12r, 12s, 12t.

The user interface 54 is included in and/or communicatively coupled to the computer 56, and generally provides for communicating with a user. The interface may include known elements, e.g., buttons, a touchscreen, a gesture recognition device, a mouse, etc. for receiving inputs from a user and one or more displays, lamps, speakers, etc. for providing output to the user. The interface 54 may further include communications elements, such as are known, e.g., an infrared transmitter, infrared receiver, radio frequency receiver, radio frequency transceiver, etc., for receiving messages from, and in some cases, sending messages to, a remote control. The interface 54 generally receives input from the user and communicates the messages to the computer 56.

For example, the user, via the remote control, may indicate that the user wishes to switch from a first media device 12q to a second media device 12r. The interface 54 may receive a message from the remote control, and transmit the message to the computer 56. Based on the message, the computer 56 may generate instructions for the Bluetooth RF switcher 44 to disconnect from the media device 12q and connect with the media device 12r.

The computer 56 includes a memory and a processor, the memory storing program code, i.e., computer-executable instructions, executable by the processor. The computer 56 is programmed to generate instructions for the Bluetooth RF switcher 44 based on input received from the interface 54. For example, a user may indicate, via the interface 54 that the user would like to listen to data from the media device 12s. The computer 56 may receive the user input from the interface 54. Based on the user input, the computer 56 may instruct the Bluetooth RF switcher 44 to generate the Bluetooth data output based on the $BTRF_3$. The Bluetooth RF switcher 44 may output the Bluetooth data output to the Bluetooth transceiver 35. The Bluetooth transceiver 35 may generate based on the Bluetooth data output, a Bluetooth radio frequency output (Bluetooth Out) and transmit the Bluetooth radio frequency output to, e.g., the Bluetooth display device 20.

Example Process

Figure 8:
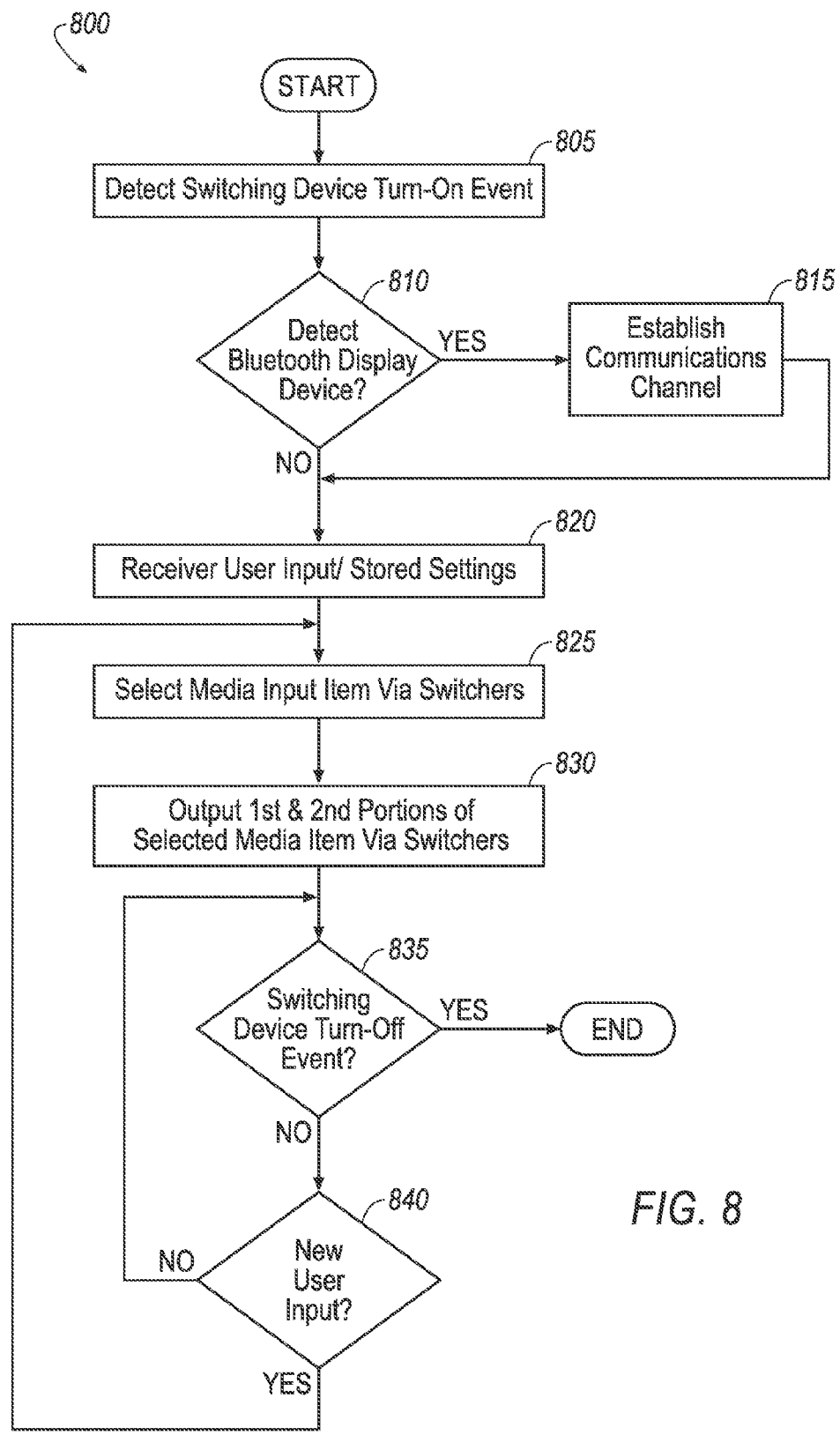
FIG. 8 is a diagram of an exemplary process 800 to switch between media sources for a stationary display device and a Bluetooth display device based on input from a user.

FIG. 8 is a diagram of an exemplary process 800 to switch between media sources 12 for a stationary display device 16 and a Bluetooth display device 20 based on input from a user. The process 800 starts with a block 805.

In the block 805, a computer 38 associated with a quad AVB switcher 14 detects a turn-on event. The turn-on event may be, for example, an indication from a stationary display device 16 (e.g., a television) that the stationary display device 16 has been turned on by the user. As another example, the turn-on event may be an input from the user, for example, via a remote control 22, that the user is turning-on the quad AVB switcher 14, or selecting a media source 12 via the quad AVB switcher 14, etc. Upon detecting a turn-on event by the computer 38, the process 800 continues in a block 810.

In the block 810, the computer 38 of the quad AVB switcher 14 may search for the presence of an active Bluetooth display device 20 such as a set of Bluetooth enabled headphones. For example, the computer 38 may send, via a Bluetooth transceiver 35 in the quad AVB switcher 14, one or more transmissions indicating that the transceiver 35 is available for connecting with a Bluetooth display device 20. A Bluetooth transceiver in the Bluetooth display device 20 may receive the transmission from the quad AVB switcher 14 and respond. The Bluetooth transceiver 35 in the quad AVB switcher 14 may receive the response, and indicate to the computer 38 that the Bluetooth display device 20 is available. In the case that an active Bluetooth display device 20 is detected, the process 800 continues in a block 815. In the case that no active Bluetooth display 20 is detected, the process 800 continues in a block 820.

In the block 815, the Bluetooth transceiver 35 in the quad AVB switcher 14 establishes a communications channel with the Bluetooth transceiver in the Bluetooth display device 20 according to Bluetooth protocol as is known. The process continues in a block 820.

In the block 820, which may follow from the block 810 or the block 815, the computer 38 of the quad AVB switcher 14 receives user input and/or retrieves data stored in memory indicating a selection of a media source 12. For example, upon detecting a turn-on event, as described in the block 805 above, the computer 38 may retrieve data from memory indicating the most recent media source 12 used to provide media content, or indicating a default media source 12 to provide media content. As another example, the turn-on event may be an input from a user indicating a media source 12 selection. Upon receiving/retrieving the media source selection data by the computer 38, the process 800 continues in a block 825.

In the block 825, the computer 38 selects a media input item for transmission to a stationary display device 16, and when activated, a Bluetooth display device 20. As described above, the computer 38 may send an instruction to a video switcher 30. Based on the instruction, the video switcher 30 generates a video output, which includes a selected one of the video inputs $V_1$-$V_4$.

Similarly, also as described above, the computer 38 may send an instruction to an audio switcher 32, 33 which may generate an audio output, including a selected one of the audio inputs $A_1$-$A_4$.

Additionally or alternatively, in the case that an active Bluetooth display device is detected as described with respect block 810 above, the quad AVB switcher 14 may generate a Bluetooth output including a media input item. The media input item may be an audio input $A_1$-$A_4$, a Bluetooth data input $BTD_1$-$BTD_4$, or a Bluetooth radio frequency input $BTRF_1$-$BTRF_4$.

Referring to FIG. 3, the quad AVB switcher 14a may include a Bluetooth switcher 34 which receives the media input items $BTD_1$-$BTD_4$ as inputs. Based on an instruction from the computer 38, it may generate a Bluetooth data output signal including one of the media input items $BTD_1$-$BTD_4$ and output the Bluetooth data output signal to the Bluetooth transceiver 35.

Referring to FIG. 5, the quad AVB switcher 14c may include the audio switcher 33. The audio switcher 33 may generate, based on an instruction from the computer 38, a Bluetooth data output signal including one of the media input items $A_1$-$A_4$ and output the Bluetooth data output signal to the Bluetooth transceiver 35.

Referring to FIG. 6, the quad AVB switcher 14d may include the Bluetooth radio frequency (RF) switcher 44. The Bluetooth RF switcher 44 may generate, based on an instruction from the computer 38, a Bluetooth data output signal including one of the media input items $BTRF_1$-$BTRF_4$ and output the Bluetooth data output signal to the Bluetooth transceiver 35.

Upon generation of one or more of the video output, the audio output, and the Bluetooth data output, the process 800 continues in a block 830.

In the block 830, the computer 38 of the quad AVB switcher 14 outputs one or more of the video output, the audio output and the Bluetooth output. The video output may be output, for example, via the video switcher 30 through a wired or wireless connection to the stationary display device 16. The audio output may similarly be output via the audio switcher 32, 33 through a wired or wireless connection to the stationary display device 16.

The Bluetooth data output signal may be converted to a Bluetooth radio frequency signal (Bluetooth Out) and transmitted via the Bluetooth transceiver 35 through the communications channel formed as described in the block 815, to the Bluetooth display device 20. The process 800 continues in a block 835.

In the block 835, the computer 38 determines whether a turn-off event has occurred. For example, the computer 38 may receive an input from the stationary display device 16 that the stationary display device 16 has been turned off. As another example, the computer 38 may receive an input from a user via the interface 36 that the quad AVB switcher 14 has been turned off. In the case that the computer 38 detects a turn-off event, the process 800 ends. In the case that no turn-off event is detected, the process 800 continues in a block 840.

In the block 840, the computer 38 determines whether new user input, requesting, for example switching from a first media source to a second media source. In the case that new user input has been received, the process continues in the block 825. Otherwise, the process 800 continues in the block 835.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, etc.

The term "exemplary" is used herein in the sense of signifying an example, e.g., a reference to an "exemplary widget" should be read as simply referring to an example of a widget.

Networked devices such as those discussed herein generally each include instructions executable by one or more networked devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a networked device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A media switching device comprising:
   a computer including a processor and a memory, the memory storing instructions executable by the processor such that the processor is programmed to actuate the media switching device to:
   transmit, via a first wired connection to a first display device, a first portion of a first media content item during a reception of the first media content item from a first media source device;
   transmit, via a first radio frequency transceiver to a second media display device, a second portion of the first media content item during the reception of the first media content item from the first media source device;
   switch, based on a first input received from a user, a second media source device;
   receive a second media content item from the second media source device;
   transmit, during the reception of the second media content item, a first portion of the second media content item via the first wired connection to the first media display device; and
   transmit, during the reception of the second media content item, a second portion of the second media content item to the second media display device via the first radio frequency transceiver.

2. The media switching device of claim 1, wherein the processor is further programmed to:
   establish, prior to transmitting the second portion of the first media content item, a first radio frequency communications channel between the first radio frequency transceiver and the second media display device.

3. The media switching device of claim 1, wherein the processor is further programmed to:
   receive the first portion of the second media content item via a second wired connection with the second media source device; and
   receive the second portion of the second media content item via a third wired connection with the second media source device.

4. The media switching device of claim 1, wherein the first portion of each of the first and second media content items includes video data.

5. The media switching device of claim 1, wherein the second portion of each of the first and second media content items includes audio data.

6. The media device of claim 1, further comprising:
   a second radio frequency transceiver programmed to:

establish a second radio frequency communications channel between the second radio frequency transceiver and the first media source device; and receive the second portion of the first media content item via the second radio frequency communications channel.

7. The media device of claim 6, wherein the processor is further programmed to:

generate the first radio frequency output based on the second portion of the first media content item received via the second radio frequency communications channel.

8. The media device of claim 6, wherein the processor is further programmed to:

instruct, based on the first input from the user, the second radio frequency transceiver to release the second communications channel with the first media source device and establish a third radio frequency communications channel with the second media source device.

9. The media device of claim 8, wherein the processor is further programmed to:

generate a radio frequency output based on the second portion of a second media content item received via the third radio frequency communication channel.

10. A method comprising:

transmitting, by a computer included in a switching device, via a first wired connection to a first display device, a first portion of a first media content item during a reception of the first media content item from a first media source device;

transmitting, via a first radio frequency transceiver to a second media display device, a second portion of the first media content item during the reception of the first media content item from the first media source device;

switching, based on a first input received from a user, from receiving the first media content item from the first media source device to receiving a second media content item from a second media source device;

transmitting, during the reception of the second media content item, a first portion of the second media content item via the first wired connection to the first media display device; and transmitting, during the reception of the second media content item, a second portion of the second media content item to the second media display device via the first radio frequency transceiver.

11. The method of claim 10, further comprising:

establishing, prior to transmitting the second portion of the first media content item, a first radio frequency communications channel between the first radio frequency transceiver and the second media display device.

12. The method of claim 10, further comprising:

receiving the first portion of the second media content item via a second wired connection with the second media source device; and receiving the second portion of the second media content item via a third wired connection with the second media source device.

13. The method of claim 10, wherein the first portion of each of the first and second media content items includes video data.

14. The method of claim 10, wherein the second portion of the first media content item includes audio data.

15. The method of claim 10, further comprising:

establishing a second radio frequency communications channel between a second radio frequency transceiver included in the switching device and the first media source device; and receiving the second portion of the first media content item via the second radio frequency communications channel.

16. The method of claim 15, further comprising:

generating the first radio frequency output based on the second portion of the first media content item received via the second radio frequency communications channel.

17. The method of claim 15, further comprising:

instructing, based on the first input from the user, the second radio frequency transceiver to release the second communications channel with the first media source device and establish a third radio frequency communications channel with the second media source device.

18. The method of claim 17, further comprising:

generating a radio frequency output based on the second portion of a second media content item received via the third radio frequency communication channel.

* * * * *